United States Patent [19]
Leaver

[11] Patent Number: 6,022,957
[45] Date of Patent: Feb. 8, 2000

[54] AZOTHIOPHENES AND MIXTURES THEREOF

[75] Inventor: Alan T. Leaver, Manchester, United Kingdom

[73] Assignee: BASF Aktiengesellschaft, Ludwigshafen, Germany

[21] Appl. No.: 08/983,143

[22] PCT Filed: Jun. 26, 1996

[86] PCT No.: PCT/GB96/01533

§ 371 Date: May 17, 1998

§ 102(e) Date: May 17, 1998

[87] PCT Pub. No.: WO97/04030

PCT Pub. Date: Feb. 6, 1997

[30] Foreign Application Priority Data

Jul. 24, 1995 [GB] United Kingdom ............ 9515175

[51] Int. Cl.[7] .............. C09B 29/033; C09B 29/09; C09B 67/22
[52] U.S. Cl. ................. 534/753; 534/DIG. 1; 534/575; 8/527; 8/639; 8/922
[58] Field of Search .......... 534/753, DIG. 1; 8/527, 639, 922

[56] References Cited

U.S. PATENT DOCUMENTS

| | | | |
|---|---|---|---|
| 4,397,781 | 8/1983 | Clark et al. | 534/753 |
| 4,472,169 | 9/1984 | Shuttleworth et al. | 8/639 |
| 4,881,943 | 11/1989 | Brierley et al. | 534/753 X |
| 4,975,410 | 12/1990 | Weber et al. | 534/753 X |
| 5,779,781 | 7/1998 | Gregory et al. | 106/31.51 |

FOREIGN PATENT DOCUMENTS 588489  3/1994  European Pat. Off. .

*Primary Examiner*—Fiona T. Powers
*Attorney, Agent, or Firm*—Oblon, Spivak, McClelland, Maier & Neustadt, P.C.

[57] ABSTRACT

Azothiophene disperse dyes of Formula (1)

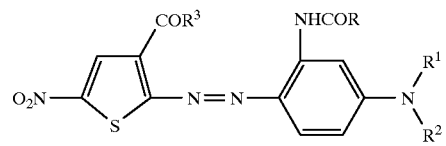

Formula (1)

in which R, $R^1$, $R^2$ and $R^3$ each independently is alkyl or alkenyl and mixtures thereof with other dyes are useful for dyeing synthetic textile material or a fiber blend thereof such as secondary cellulose acetate, cellulose triacetate, polyamide, polyacrylonitrile and aromatic polyester.

11 Claims, No Drawings

AZOTHIOPHENES AND MIXTURES THEREOF

This application is a 371 of PCT/GB96/01533 filed Jun. 26, 1996.

BACKGROUND OF THE INVENTION

Field of the Invention

This invention relates to azothiophenes, to mixtures thereof with other dyes and to a process for the coloration of synthetic textile materials with azothiophenes and said mixtures.

SUMMARY OF THE INVENTION

The present azothiophenes are not specifically disclosed but fall within the same general class of azothiophene dyes described in UK Patent 1394365 and further similar dyes are disclosed in EP 588489. The present azothiophenes have advantages in terms of light fastness, pH stability and strength over dyes disclosed in UK Patent 1394365 and EP588489.

According to the present invention, there is provided an azothiophene of Formula (1):

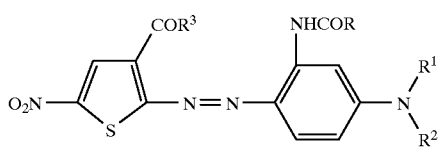

Formula (1)

in which

R, $R^1$, $R^2$ and $R^3$ each independently is alkyl or alkenyl.

The alkyl groups represented by R, $R^1$, $R^2$ and $R^3$ are preferably $C_{1-12}$-alkyl, more preferably $C_{1-6}$-alkyl and especially $C_{1-4}$-alkyl. Those alkyl groups represented by R, $R^1$, $R^2$ and $R^3$ which have three or more carbon atoms may be straight or branched chain alkyl groups. The alkenyl groups represented by R, $R^1$, $R^2$ and $R^3$ are preferably $C_{2-12}$-alkenyl, more preferably $C_{2-6}$-alkenyl and especially $C_{2-3}$-alkenyl. Preferred azothiophene dyes of Formula (1) are those in which $R^1$ and $R^2$ each independently is $C_{1-4}$-alkyl or $C_{2-3}$-alkenyl and R and $R^3$ each independently is $C_{1-4}$-alkyl. An especially preferred azothiophene of Formula (1) is that in which $R^1$ and $R^2$ are both ethyl and R and $R^3$ are both methyl.

DETAILED DESCRIPTION OF THE INVENTION

The dyes of Formula (1) may be prepared by diazotising a 2-aminothiophene of Formula (2):

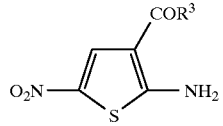

Formula (2)

and coupling the resulting diazo compound with an aromatic amine of Formula (3):

Formula (3)

in which

R, $R^1$, $R^2$ and $R^3$ are as hereinbefore defined. The diazotisation and coupling may be performed by conventionally used methods and the azothiophenes may be isolated using known techniques.

The azothiophenes of the present invention exist in various crystalline modifications and it is intended that the present definition of the azothiophenes includes such crystalline modifications which may be formed by established treatments such as heat treatment, solvent treatment, recrystallisation or seeding.

According to a further feature of the present invention, there is provided a mixture of dyes comprising an azothiophene of Formula (1) and an azothiophene of Formula (4):

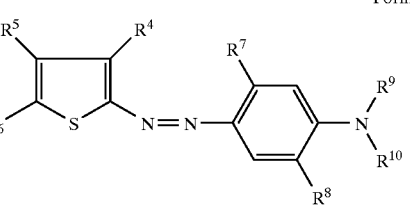

Formula (4)

in which $R^4$ is —CN, —Cl, —Br, —$NO_2$, $C_{1-4}$-alkylcarbonyl, phenylcarbonyl, $C_{1-4}$-alkylsulphonyl, —$COC_{1-4}$-alkyl, —$CONH_2$, —$CONH(C_{1-4}$-alkyl) or —$CON(C_{1-4}$-alkyl$)_2$;

$R^5$ is —H, $C_{1-4}$-alkyl, phenyl or —$COC_{1-4}$-alkyl;

$R^6$ is —H, $C_{1-4}$-alkyl, phenyl, $NO_2$, —CN, —Cl, —Br, —$COC_{1-4}$-alkyl, —$CONH_2$, —$CONH(C_{1-4}$-alkyl) or —$CON(C_{1-4}$-alkyl$)_2$;

$R^7$ is —H, $C_{1-4}$-alkyl, $C_{1-4}$-alkoxy, —Cl, —Br, —$NHCOC_{1-4}$-alkyl or —$NHSO_2C_{1-4}$-alkyl;

$R^8$ is —H, $C_{1-4}$-alkyl or $C_{1-4}$-alkoxy; and $R^9$ and $R^{10}$ each independently is —H, $C_{1-4}$-alkyl, $C_{2-4}$-alkenyl or $C_{1-4}$-alkyl substituted by —OH, $C_{1-4}$-alkoxy, —CN, phenyl, $C_{1-4}$-alkylCO—, $C_{1-4}$-alkoxyCO—, $HOC_{1-4}$-alkoxy, $C_{1-4}$-alkoxy-$C_{1-4}$-alkoxy, $C_{1-4}$-alkoxy-$C_{1-4}$-alkoxyCO—, —Cl or $C_{1-4}$-alkoxyCOO.

Preferred dyes of Formula (4) are those in which $R^4$ is —$NO_2$, —CN or $C_{1-4}$-alkylcarbonyl, $R^5$ is —H or $C_{1-4}$-alkyl, $R^6$ is —$NO_2$ or —CN, $R^7$ is $C_{1-4}$-alkyl or —$NHCOC_{1-4}$-alkyl, $R^8$ is —H or $C_{1-4}$-alkoxy, $R^9$ and $R^{10}$ each independently is $C_{1-4}$-alkyl. Especially preferred dyes of Formula (4) are those in which $R^4$ is —$NO_2$, $R^5$ is —H, $R^6$ is —$NO_2$, $R^7$ is —$CH_3$, —$C_2H_5$, —$NHCOCH_3$, —$NHCOC_2H_5$, —$NHCOC_3H_7$ or —$NHCOCH(CH_3)_3$, $R^8$ is —H or —$OCH_3$ and $R^9$ and $R^{10}$ are both —$C_2H_5$.

The dye mixtures may be prepared as physical mixtures, by co-crystallisation or co-synthesis.

Mixtures of dyes of Formulae (1) and (4) preferably comprise, on a weight basis, from 5% to 95% of a dye of Formula (1), and from 95% to 5% of a dye of Formula (4), more preferably from 20% to 80% of a dye of Formula (1) and from 80% to 20% of a dye of Formula (4) and especially from 30% to 70% of a dye of Formula (1) and from 70% to 30% of a dye of Formula (4). Other useful mixtures contain from 65% to 75% of a dye of formula (1) and from 35% to 25% of a dye of Formula (4).

According to a further feature of the present invention, there is provided a mixture of dyes comprising an azothiophene of Formula (1) and an azo compound of Formula (5):

Formula (5)

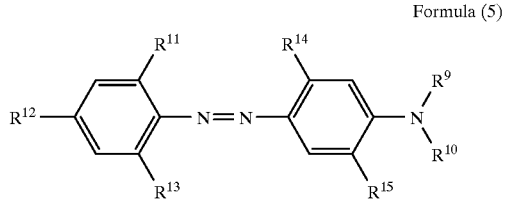

in which $R^{11}$, $R^{12}$ and $R^{13}$ each independently is —CN, —NO$_2$, —Cl or —Br, $R^{14}$ is —H, $C_{1-4}$-alkyl, —Cl, —Br, —NHCOC$_{1-4}$-alkyl or —NHSO$_2$C$_{1-4}$-alkyl;

$R^{15}$ —H, $C_{1-4}$-alkyl or $C_{1-4}$-alkoxy; and $R^9$ and $R^{10}$ are as herein before defined.

A first preferred dye of Formula (5) is that in which $R^{11}$ and $R^{13}$ are —CN, $R^{12}$ is —NO$_2$, $R^{14}$ is —CH$_3$, $R^{15}$ is —H and $R^9$ and $R^{10}$ are both —C$_2$H$_5$.

A second preferred dye of Formula (5) is that in which $R^{11}$ is —CN, $R^{12}$ is —NO$_2$, $R^{13}$ is —Br, $R^{14}$ is —NHCOCH$_3$, $R^{15}$ is —H and $R^9$ and $R^{10}$ are both —C$_2$H$_5$.

A third preferred dye of Formula (5) is that in which $R^{11}$ is —CN, $R^{12}$ is —NO$_2$, $R^{13}$ is —Br, $R^{14}$ is —NHCOC$_2$H$_5$, $R^{15}$ is —H and $R^9$ and $R^{10}$ are both —C$_2$H$_5$.

A fourth preferred dye of Formula (5) is that in which $R^{11}$ and $R^{13}$ are —CN, $R^{12}$ is —NO$_2$, $R^{14}$ is —NHCOCH$_3$, $R^{15}$ is —H and $R^9$ and $R^{10}$ are both —C$_2$H$_5$.

A fifth preferred dye of Formula (5) is that in which $R^{11}$ and $R^{12}$ are —NO$_2$, $R^{13}$ is —CN, $R^{14}$ is —NHCOCH$_3$, $R^{15}$ is —H and $R^9$ and $R^{10}$ are both —C$_2$H$_5$.

A sixth preferred dye of Formula (5) is that in which $R^{11}$ and $R^{12}$ are —NO$_2$, $R^{13}$ is —Br, $R^{14}$ is —NHCOCH$_3$, $R^{15}$ is —OCH$_3$ and $R^9$ and $R^{10}$ are both —C$_2$H$_5$.

Mixtures of dyes of Formula (1) and (5) preferably comprise from 5% to 95% by weight of a dye of Formula (1) and from 95% to 5% by weight of a dye of Formula (5).

A first preferred mixture of dyes comprises from 10% to 20% of a dye of Formula (1) in which $R^1$ and $R^2$ each independently is $C_{1-4}$-alkyl or $C_{2-3}$-alkenyl and R and $R^3$ each independently is $C_{1-4}$-alkyl and from 90% to 80% of a dye of Formula (5) in which $R^{11}$ is —CN, $R^{12}$ is —NO$_2$, $R^{13}$ is —Br, $R^{14}$ is —NHCOCH$_3$, $R^{15}$ is —H and $R^9$ and $R^{10}$ are both —C$_2$H$_5$.

A second preferred mixture of dyes comprises from 35% to 45% of a dye of Formula (1) in which $R^1$ and $R^2$ each independently is $C_{1-4}$-alkyl or $C_{2-3}$-alkenyl and R and $R^3$ each independently is $C_{1-4}$-alkyl and from 65% to 55% of a dye of Formula (5) in which $R^{11}$ and $R^{13}$ are —CN, $R^{12}$ is —NO$_2$, $R^{14}$ is —CH$_3$, $R^{15}$ is —H and $R^9$ and $R^{10}$ are both —C$_2$H$_5$.

The azothiophene dyes of Formula (1) may advantageously be mixed with other known disperse dyes. As examples of such dyes, there may be mentioned the following dyes or classes of dyes.

One class of disperse dyes which may be mixed with the dyes of Formula (1) comprises azothiophene dyes derived from 2-amino-4-chloro-5-formylthiophene diazo components, for example dyes of the general formula:

Formula (6)

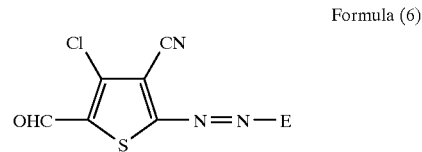

wherein E represents the residue of a coupling component. Such dyes are described in EP-A-0201896 and include, for example, the dye of the formula:

Formula (7)

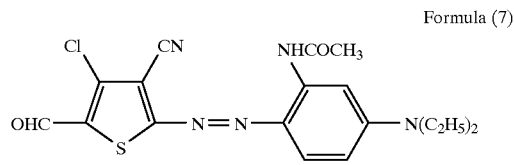

Another class of disperse dyes which may be mixed with the dyes of Formula (1) comprises azo dyes derived from nitro-substituted aminothiazole diazo compounds, for example dyes of the formula:

Formula (8)

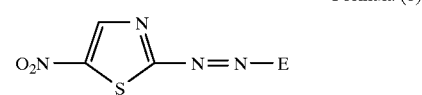

wherein E represents the residue of a coupling component. As examples of such dyes, there may be mentioned the dyes of the formula:

Formula (9)

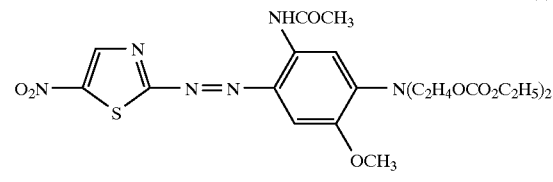

and

Formula (10)

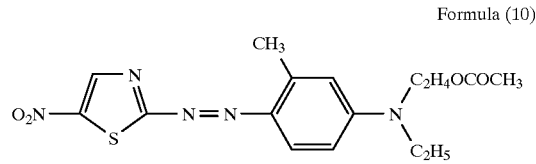

Another class of disperse dyes which may be mixed with the dyes of Formula (1) comprises azo dyes derived from 3-amino-2,1-benzisothiazole diazo components, for example the dye of the formula:

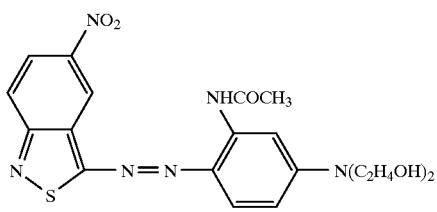
Formula (11)

Further dyes which may be mixed with the dyes of Formula (1) include the anthraquinone dyes of the formulae:

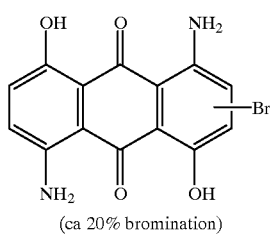
Formula (12)

(ca 20% bromination)

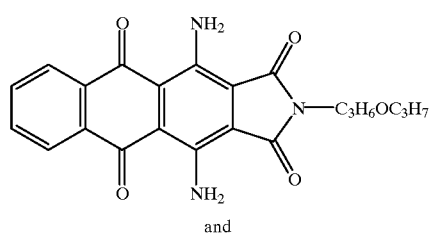
Formula (13)

and

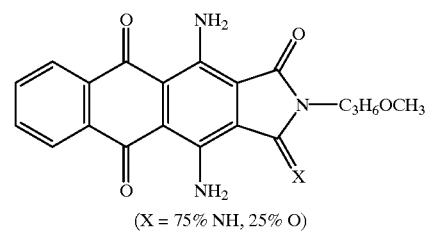
Formula (14)

(X = 75% NH, 25% O)

Another class of disperse dyes which may be mixed with the dyes of Formula (1) comprises dicyanovinylpyrroline dyes of the type described in WO94/10248 and GB-A-2191498. As an example of such dyes, there may be mentioned the dye of the formula:

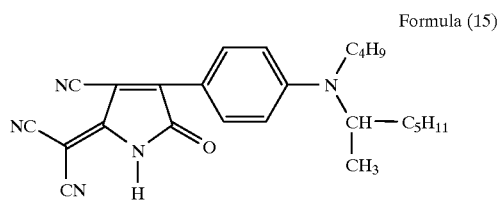
Formula (15)

Another class of disperse dyes which may be mixed with the dyes of Formula (1) comprises the 3-dicyanomethylidene-2,3-dihydrothiophen-1,1-dioxide derivatives of the type described in GB-A-2026528. As an example of such dyes, there may be mentioned the dye of the formula:

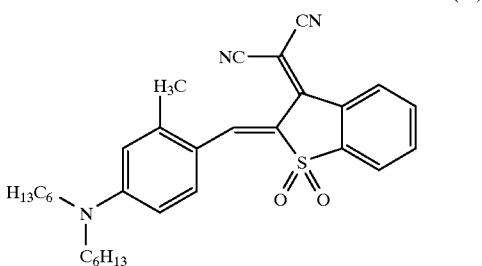
Formula (16)

Another class of disperse dyes which may be mixed with the dyes of Formula (1) comprises yellow monoazo dyes obtained by the use of a hydroxypyridone coupling component, for example a 1,4-dialkyl-3-cyano-6-hydroxypyrid-2-one coupling component. Examples of such dyes include the dyes of the formula:

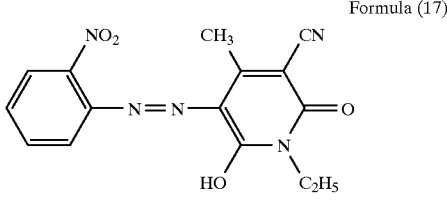
Formula (17)

and

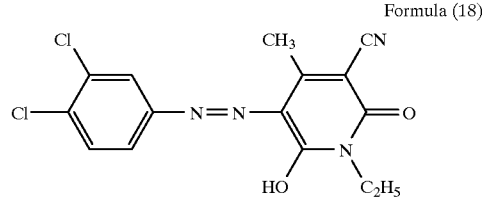
Formula (18)

The disperse dyes of Formulae (6) to (18) may be mixed with dyes of Formula (1) in amounts of from 5–95% by weight of the former to from 95–5% by weight of the latter.

The azothiophenes and the mixtures thereof of the present invention are useful as disperse dyes and are valuable for colouring synthetic textile materials and fibre blends thereof.

According to a further feature of the present invention, there is provided a process for colouring a synthetic textile material or fibre blend thereof which comprises applying to the synthetic textile material an azothiophene of Formula (1) or a mixture thereof with at is least one other disperse dye.

The synthetic textile material may be selected from secondary cellulose acetate, cellulose triacetate, polyamide, polyacrylonitrile and aromatic polyester. The synthetic textile material is preferably polyamide such as polyhexamethylene adipamide or aromatic polyester especially polyethylene terephthalate. Fibre blends may comprise mixtures of different synthetic textile materials or mixtures of synthetic and natural textile materials. Preferred fibre blends include those of polyester-cellulose such as polyester-cotton. The textile materials or blends thereof may be in the form of filaments, loose fibres, yarn or woven or knitted fibres.

The azothiophene of Formula (1) or mixtures thereof optionally in conjunction with other disperse dyes may be applied to the synthetic textile materials or fibre blends thereto by processes which are conventionally employed in applying disperse dyes to such materials and fibre blends.

Suitable process conditions may be selected from the following:

i) exhaust dyeing at a pH of from 4 to 6.5, at a temperature of from 125° C. to 140° C. for from 10 to 120 minutes and under a pressure of from 1 to 2 bar, a sequestrant optionally being added;

ii) continuous dyeing at a pH of from 4 to 6.5, at a temperature of from 190° C. to 225° C. for from 15 seconds to 5 minutes, a migration inhibitor optionally being added;

iii) printing direct at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 120° C. to 140° C. and 1 to 2 bar for from 10 to 45 minutes for pressure steaming, wetting agents and thickeners (such as alginates) of from 5 to 100% by weight of the dye optionally being added;

iv) discharge printing (by padding the dye on to the textile material, drying and overprinting) at a pH of from 4 to 6.5, migration inhibitors and thickeners optionally being added;

v) carrier dyeing at a pH of from 4 to 6.5, at a temperature of from 95° C. to 100° C. using a carrier such as methylnaphthalene, diphenylamine or 2-phenylphenol, sequestrants optionally being added; and vi) atmospheric dyeing of acetate, triacetate and nylon at a pH of from 4 to 6.5, at a temperature of 85° C. for acetate or at a temperature of 90° C. for triacetate and nylon for from 15 to 90 minutes, sequestrants optionally being added.

In all the above processes, the azothiophene of Formula (1) or mixture thereof is applied as a dispersion comprising from 0.001% to 4% of the azothiophene or mixture thereof in aqueous medium.

Compositions comprising dispersions of the azothiophene of Formula (1) or of mixtures of dyes or Formula (1) and the other disperse dyes mentioned above form further features of the present invention. The compositions typically comprise from 1% to 40% of the azothiophene of Formula (1) or mixture of dyes in an aqueous medium. The compositions are preferably buffered at pH 2 to 7 more preferably at pH 4 to 6.

These dye dispersions may further comprise ingredients conventionally used in coloration applications such as dispersing agents, for example lignosulphonates, naphthalene sulphonic acidformaldehyde condensates or pheno/creso/sulphanilic acid/formaldehyde condensates, surfactants, wetting agents such as alkyl aryl ethoxylates which may be sulphonated or phosphated, inorganic salts, de-foamers such as mineral oil or nonanol, organic liquids and buffers. Dispersing agents may be present at from 10% to 200% on the weight of the azothiophene of Formula (1) or on the weight of mixtures thereof. Wetting agents may be used at from 0% to 20% on the weight of the azothiophene of Formula (1) or on the mixture of dyes.

The dispersions may be prepared by bead milling the azothiophene of Formula (1) or mixture of dyes with glass beads or sand in an aqueous medium. Dispersions may have further additions of dispersing agents, fillers and other surfactants and may be dried, by a technique such as spray drying, to give a solid composition comprising from 5% to 60% of dyestuff.

In addition to the above-mentioned application processes, the azothiophenes of Formula (1) and dye mixtures derived therefrom may be applied to synthetic textile materials and fibre blends by ink-jet printing, the substrates optionally having been pretreated to aid printing. For ink-jet applications, the application medium may comprise water and a water-soluble organic solvent, preferably in a weight ratio of 1:99 to 99:1, more preferably 1:95 to 50:50 and especially in the range 10:90 to 40:60. The water-soluble organic solvent preferably comprises a $C_1$–$C_4$-alkanol, especially methanol or ethanol, a ketone, especially acetone, methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl) sulphone or mixtures thereof.

The azothiophenes of Formula (1) and dye mixtures derived therefrom may also be applied to textile materials using supercritical fluid solvents for example supercritical carbon dioxide, in which case the dye formulating agents may optionally be omitted.

The invention is further illustrated by the following Examples:

EXAMPLE 1

Preparation of:

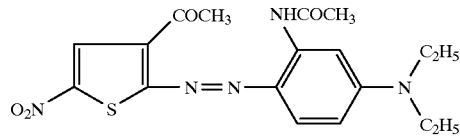

Sodium nitrite (3.22g) was added to concentrated sulphuric acid (20 cm$^3$) and the mixture heated to 70° C. and then cooled to 5° C. Further concentrated sulphuric acid (15 cm$^3$) was added followed by 25 cm$^3$ of a 86:14 mixture of acetic acid and propionic acid. 2-Amino-3-acetyl-5-nitrthiophene (8.5 g) was then added slowly below 0° C and the mixture stirred at −2° C. to 0° C. for 2 hours and then 0° C. to 2° C. for 3 hours when diazotisation was complete. The solution was then added to a mixture of 3-N,N-diethylaminoacetanilide (10.3 g), methanol (75 cm$^3$), crushed ice (180 g) and sulphamic acid (1.0 g). The temperature was maintained at 0–5° C. and the pH at 1–2 by the addition of sodium acetate solution. The mixture was stirred at 0–5° C. for 2 hours and then the product was isolated by filtration and washed with water. Yield after drying 12.9 g.

When applied to an aromatic polyester material from an aqueous dispersion, it gives bright greenish-blue shades.

Comparative Data

The application properties of the dye of Example 1 were compared with those of a dye of Formula (6):

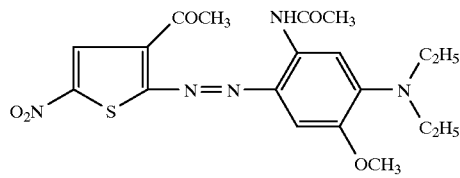

Formula (6)

which is disclosed in EP 588 489 as Example 2.

a) by application on polyester dyed at 130° C. for 1 hour the dye of Formula (1) is at least twice as strong as the dye of Formula (6).

b) In a light fastness test (ISO 105:BO2) the light fastness of the dye of Formula (1) is better, having a fastness rating of 4–5 at both pale and heavy depths of shade, than the dye of Formula (6) having a fastness rating of 4.

c) the dyes of Formula (1) and Formula (6) were used to dye polyester at pale and heavy depths of shade at 130° C. for 1 hour at pH 4.5, 5.5, 6.5 and 7.5. The strength of the dyeings at each pH were assessed using reflectance colour difference measurements and are summarised in Table 1:

|  |  | Strength of Dyeing | | | |
| --- | --- | --- | --- | --- | --- |
| Dye | Depth of Shade | pH 4.5 | pH 5.5 | pH 6.5 | pH 7.5 |
| Example 1 | Pale | 100 | 100 | 100 | 98.7 |
| Formula 6 | Pale | 100 | 100 | 83.3 | 43.3 |
| Example 1 | Heavy | 100 | 100 | 100 | 100 |
| Formula 6 | Heavy | 100 | 100 | 88.3 | 50.0 |

The following dyes of Formula (1) can be prepared by the procedure of Example 1, by diazotising the appropriate amine and coupling onto the appropriate coupling component.

| Example | R | $R^1$ | $R^2$ | $R^3$ |
| --- | --- | --- | --- | --- |
| 2 | —$CH_3$ | —$C_3H_7$ | —$C_3H_7$ | —$CH_3$ |
| 3 | —$C_2H_5$ | —$C_2H_5$ | —$C_2H_5$ | —$CH_3$ |
| 4 | —$CH_3$ | —$C_2H_5$ | —$C_2H_5$ | —$C_2H_5$ |

The dyes of Formula (1) can be used in mixtures with other dyes, as shown in the following Examples, for the coloration of aromatic polyester textile material.

EXAMPLES 5–23

Dye A is the dye of Example 1.

Dye B has the structure:

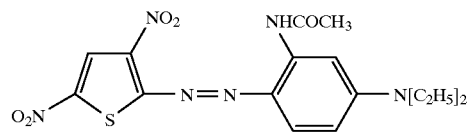

| Example | % A | % B |
| --- | --- | --- |
| 5 | 5 | 95 |
| 6 | 10 | 90 |
| 7 | 15 | 85 |
| 8 | 20 | 80 |
| 9 | 25 | 75 |
| 10 | 30 | 70 |
| 11 | 35 | 65 |
| 12 | 40 | 60 |
| 13 | 45 | 55 |
| 14 | 50 | 50 |
| 15 | 55 | 45 |
| 16 | 60 | 40 |
| 17 | 65 | 35 |
| 18 | 70 | 30 |
| 19 | 75 | 25 |
| 20 | 80 | 20 |
| 21 | 85 | 15 |
| 22 | 90 | 10 |
| 23 | 95 | 5 |

EXAMPLES 24–42

Dye A is the dye of Example 1.

Dye B has the structure:

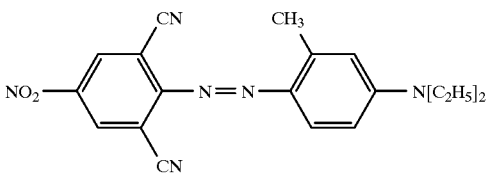

| Example | % A | % B |
| --- | --- | --- |
| 24 | 5 | 95 |
| 25 | 10 | 90 |
| 26 | 15 | 85 |
| 27 | 20 | 80 |
| 28 | 25 | 75 |
| 29 | 30 | 70 |
| 30 | 35 | 65 |
| 31 | 40 | 60 |
| 32 | 45 | 55 |
| 33 | 50 | 50 |
| 34 | 55 | 45 |
| 35 | 60 | 40 |
| 36 | 65 | 35 |
| 37 | 70 | 30 |
| 38 | 75 | 25 |
| 39 | 80 | 20 |
| 40 | 85 | 15 |
| 41 | 90 | 10 |
| 42 | 95 | 5 |

EXAMPLES 43–61

Dye A is the dye of Example 1.

Dye B has the structure:

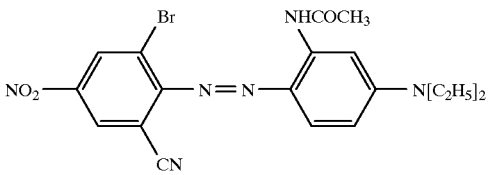

| Example | % A | % B |
| --- | --- | --- |
| 43 | 5 | 95 |
| 44 | 10 | 90 |

-continued
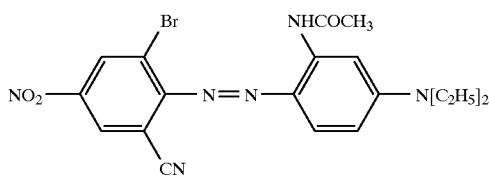
| Example | % A | % B |
|---|---|---|
| 45 | 15 | 85 |
| 46 | 20 | 80 |
| 47 | 25 | 75 |
| 48 | 30 | 70 |
| 49 | 35 | 65 |
| 50 | 40 | 60 |
| 51 | 45 | 55 |
| 52 | 50 | 50 |
| 53 | 55 | 45 |
| 54 | 60 | 40 |
| 55 | 65 | 35 |
| 56 | 70 | 30 |
| 57 | 75 | 25 |
| 58 | 80 | 20 |
| 59 | 85 | 15 |
| 60 | 90 | 10 |
| 61 | 95 | 5 |
EXAMPLES 62–80
Dye A is the dye of Example 1.
Dye B has the structure:
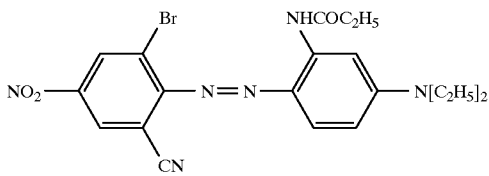
| Example | % A | % B |
|---|---|---|
| 62 | 5 | 95 |
| 63 | 10 | 90 |
| 64 | 15 | 85 |
| 65 | 20 | 80 |
| 66 | 25 | 75 |
| 67 | 30 | 70 |
| 68 | 35 | 65 |
| 69 | 40 | 60 |
| 70 | 45 | 55 |
| 71 | 50 | 50 |
| 72 | 55 | 45 |
| 73 | 60 | 40 |
| 74 | 65 | 35 |
| 75 | 70 | 30 |
| 76 | 75 | 25 |
| 77 | 80 | 20 |
| 78 | 85 | 15 |
| 79 | 90 | 10 |
| 80 | 95 | 5 |
EXAMPLES 81–99
Dye A is the dye of Example 1
Dye B has the structure:
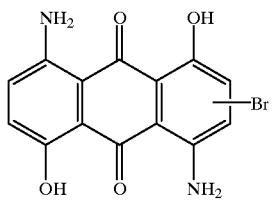
| Example | % A | % B |
|---|---|---|
| 81 | 5 | 95 |
| 82 | 10 | 90 |
| 83 | 15 | 85 |
| 84 | 20 | 80 |
| 85 | 25 | 75 |
| 86 | 30 | 70 |
| 87 | 35 | 65 |
| 88 | 40 | 60 |
| 89 | 45 | 55 |
| 90 | 50 | 50 |
| 91 | 55 | 45 |
| 92 | 60 | 40 |
| 93 | 65 | 35 |
| 94 | 70 | 30 |
| 95 | 75 | 25 |
| 96 | 80 | 20 |
| 97 | 85 | 15 |
| 98 | 90 | 10 |
| 99 | 95 | 5 |
EXAMPLES 100–118
Dye A is the dye of Example 1.
Dye B has the structure:
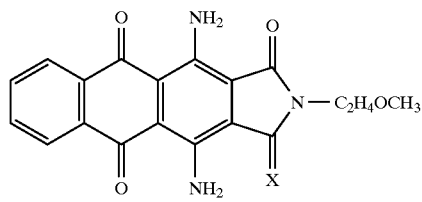
X = NH/O
| Example | % A | % B |
|---|---|---|
| 100 | 5 | 95 |
| 101 | 10 | 90 |
| 102 | 15 | 85 |
| 103 | 20 | 80 |
| 104 | 25 | 75 |
| 105 | 30 | 70 |
| 106 | 35 | 65 |
| 107 | 40 | 60 |
| 108 | 45 | 55 |
| 109 | 50 | 50 |
| 110 | 55 | 45 |
| 111 | 60 | 40 |
| 112 | 65 | 35 |
| 113 | 70 | 30 |
| 114 | 75 | 25 |
| 115 | 80 | 20 |
| 116 | 85 | 15 |

-continued
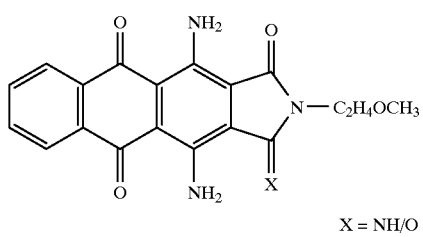
X = NH/O
| Example | % A | % B |
|---------|-----|-----|
| 117 | 90 | 10 |
| 118 | 95 | 5 |
EXAMPLES 119–137
Dye A is the dye of Example 1.
Dye B has the structure
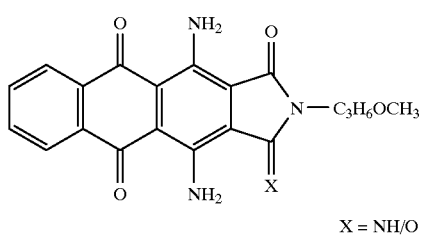
X = NH/O
| Example | % A | % B |
|---------|-----|-----|
| 119 | 5 | 95 |
| 120 | 10 | 90 |
| 121 | 15 | 85 |
| 122 | 20 | 80 |
| 123 | 25 | 75 |
| 124 | 30 | 70 |
| 125 | 35 | 65 |
| 126 | 40 | 60 |
| 127 | 45 | 55 |
| 128 | 50 | 50 |
| 129 | 55 | 45 |
| 130 | 60 | 40 |
| 131 | 65 | 35 |
| 132 | 70 | 30 |
| 133 | 75 | 25 |
| 134 | 80 | 20 |
| 135 | 85 | 15 |
| 136 | 90 | 10 |
| 137 | 95 | 5 |
EXAMPLES 138–156
Dye A is the dye of Example 1.
Dye B has the structure:
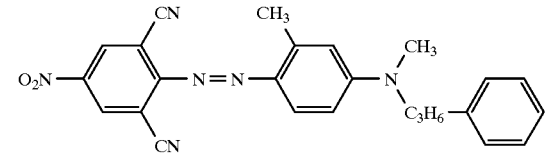
| Example | % A | % B |
|---------|-----|-----|
| 138 | 5 | 95 |
| 139 | 10 | 90 |
| 140 | 15 | 85 |
| 141 | 20 | 80 |
| 142 | 25 | 75 |
| 143 | 30 | 70 |
| 144 | 35 | 65 |
| 145 | 40 | 60 |
| 146 | 45 | 55 |
| 147 | 50 | 50 |
| 148 | 55 | 45 |
| 149 | 60 | 40 |
| 150 | 65 | 35 |
| 151 | 70 | 30 |
| 152 | 75 | 25 |
| 153 | 80 | 20 |
| 154 | 85 | 15 |
| 155 | 90 | 10 |
| 156 | 95 | 5 |
EXAMPLES 157–175
Dye A is the dye of Example 1.
Dye B has the structure:
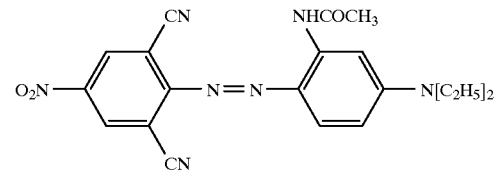
| Example | % A | % B |
|---------|-----|-----|
| 157 | 5 | 95 |
| 158 | 10 | 90 |
| 159 | 15 | 85 |
| 160 | 20 | 80 |
| 161 | 25 | 75 |
| 162 | 30 | 70 |
| 163 | 35 | 65 |
| 164 | 40 | 60 |
| 165 | 45 | 55 |
| 166 | 50 | 50 |
| 167 | 55 | 45 |
| 168 | 60 | 40 |
| 169 | 65 | 35 |
| 170 | 70 | 30 |
| 171 | 75 | 25 |
| 172 | 80 | 20 |
| 173 | 85 | 15 |
| 174 | 90 | 10 |
| 175 | 95 | 5 |

EXAMPLES 176–194
Dye A is the dye of Example 1
Dye B has the structure:
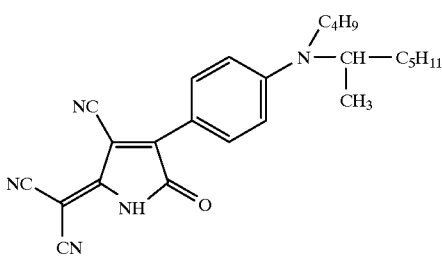
| Example | % A | % B |
|---|---|---|
| 176 | 5 | 95 |
| 177 | 10 | 90 |
| 178 | 15 | 85 |
| 179 | 20 | 80 |
| 180 | 25 | 75 |
| 181 | 30 | 70 |
| 182 | 35 | 65 |
| 183 | 40 | 60 |
| 184 | 45 | 55 |
| 185 | 50 | 50 |
| 186 | 55 | 45 |
| 187 | 60 | 40 |
| 188 | 65 | 35 |
| 189 | 70 | 30 |
| 190 | 75 | 25 |
| 191 | 80 | 20 |
| 192 | 85 | 15 |
| 193 | 90 | 10 |
| 194 | 95 | 5 |
EXAMPLES 195–213
Dye A is the dye of Example 1.
Dye B has the structure:
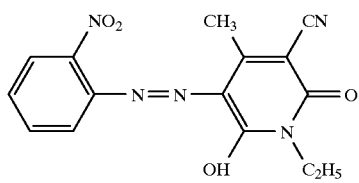
| Example | % A | % B |
|---|---|---|
| 195 | 5 | 95 |
| 196 | 10 | 90 |
| 197 | 15 | 85 |
| 198 | 20 | 80 |
| 199 | 25 | 75 |
| 200 | 30 | 70 |
| 201 | 35 | 65 |
| 202 | 40 | 60 |
| 203 | 45 | 55 |
| 204 | 50 | 50 |
| 205 | 55 | 45 |
| 206 | 60 | 40 |
| 207 | 65 | 35 |
| 208 | 70 | 30 |
| 209 | 75 | 25 |
| 210 | 80 | 20 |
| 211 | 85 | 15 |
-continued
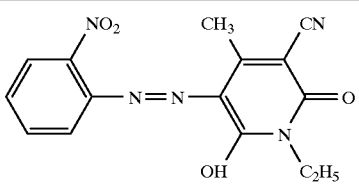
| Example | % A | % B |
|---|---|---|
| 212 | 90 | 10 |
| 213 | 95 | 5 |
EXAMPLES 214–232
Dye A is the dye of Example 1.
Dye B has the structure:
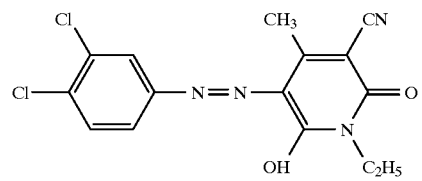
| Example | % A | % B |
|---|---|---|
| 214 | 5 | 95 |
| 215 | 10 | 90 |
| 216 | 15 | 85 |
| 217 | 20 | 80 |
| 218 | 25 | 75 |
| 219 | 30 | 70 |
| 220 | 35 | 65 |
| 221 | 40 | 60 |
| 222 | 45 | 55 |
| 223 | 50 | 50 |
| 224 | 55 | 45 |
| 225 | 60 | 40 |
| 226 | 65 | 35 |
| 227 | 70 | 30 |
| 228 | 75 | 25 |
| 229 | 80 | 20 |
| 230 | 85 | 15 |
| 231 | 90 | 10 |
| 232 | 95 | 5 |
EXAMPLES 233—251
Dye A is the dye of Example 1.
Dye B has the structure:
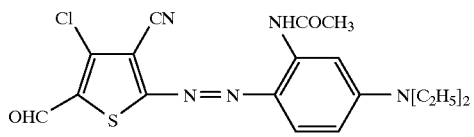
| Example | % A | % B |
|---|---|---|
| 233 | 5 | 95 |
| 234 | 10 | 90 |
| 235 | 15 | 85 |

-continued
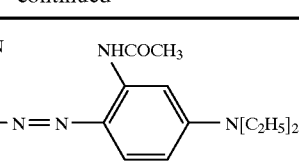
| Example | % A | % B |
|---|---|---|
| 236 | 20 | 80 |
| 237 | 25 | 75 |
| 238 | 30 | 70 |
| 239 | 35 | 65 |
| 240 | 40 | 60 |
| 241 | 45 | 55 |
| 242 | 50 | 50 |
| 243 | 55 | 45 |
| 244 | 60 | 40 |
| 245 | 65 | 35 |
| 246 | 70 | 30 |
| 247 | 75 | 25 |
| 248 | 80 | 20 |
| 249 | 85 | 15 |
| 250 | 90 | 10 |
| 251 | 95 | 5 |
EXAMPLES 252–270
Dye A is the dye of Example 4.
Dye B has the structure:
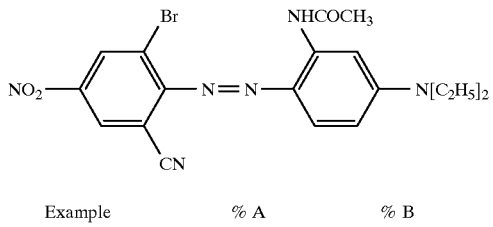
| Example | % A | % B |
|---|---|---|
| 252 | 5 | 95 |
| 253 | 10 | 90 |
| 254 | 15 | 85 |
| 255 | 20 | 80 |
| 256 | 25 | 75 |
| 257 | 30 | 70 |
| 258 | 35 | 65 |
| 259 | 40 | 60 |
| 260 | 45 | 55 |
| 261 | 50 | 50 |
| 262 | 55 | 45 |
| 263 | 60 | 40 |
| 264 | 65 | 35 |
| 265 | 70 | 30 |
| 266 | 75 | 25 |
| 267 | 80 | 20 |
| 268 | 85 | 15 |
| 269 | 90 | 10 |
| 270 | 95 | 5 |
EXAMPLES 271–289
Dye A is the dye of Example 4.
Dye B has the structure:
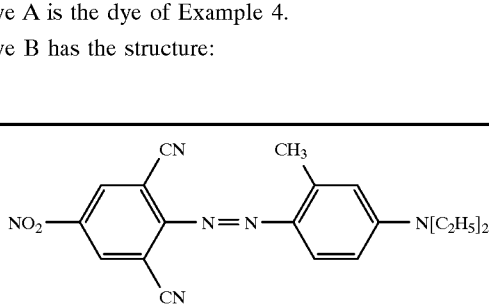
| Example | % A | % B |
|---|---|---|
| 271 | 5 | 95 |
| 272 | 10 | 90 |
| 273 | 15 | 85 |
| 274 | 20 | 80 |
| 275 | 25 | 75 |
| 276 | 30 | 70 |
| 277 | 35 | 65 |
| 278 | 40 | 60 |
| 279 | 45 | 55 |
| 280 | 50 | 50 |
| 281 | 55 | 45 |
| 292 | 60 | 40 |
| 283 | 65 | 35 |
| 284 | 70 | 30 |
| 285 | 75 | 25 |
| 286 | 80 | 20 |
| 287 | 85 | 15 |
| 288 | 90 | 10 |
| 289 | 95 | 5 |
EXAMPLES 290–308
Dye A is the dye of Example 4.
Dye B has the structure:
| Example | % A | % B |
|---|---|---|
| 290 | 5 | 95 |
| 291 | 10 | 90 |
| 292 | 15 | 85 |
| 293 | 20 | 80 |
| 294 | 25 | 75 |
| 295 | 30 | 70 |
| 296 | 35 | 65 |
| 297 | 40 | 60 |
| 298 | 45 | 55 |
| 299 | 50 | 50 |
| 300 | 55 | 45 |
| 301 | 60 | 40 |
| 302 | 65 | 35 |
| 303 | 70 | 30 |
| 304 | 75 | 25 |
| 305 | 80 | 20 |
| 306 | 85 | 15 |
| 307 | 90 | 10 |
| 308 | 95 | 5 |

EXAMPLES 309–327

Dye A is the dye of Example 3.

Dye B has the structure:

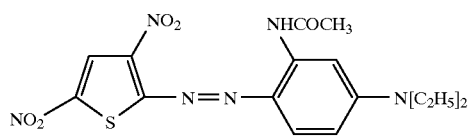

| Example | % A | % B |
|---------|-----|-----|
| 309 | 5 | 95 |
| 310 | 10 | 90 |
| 311 | 15 | 85 |
| 312 | 20 | 80 |
| 313 | 25 | 75 |
| 314 | 30 | 70 |
| 315 | 35 | 65 |
| 316 | 40 | 60 |
| 317 | 45 | 55 |
| 318 | 50 | 50 |
| 319 | 55 | 45 |
| 320 | 60 | 40 |
| 321 | 65 | 35 |
| 322 | 70 | 30 |
| 323 | 75 | 25 |
| 324 | 80 | 20 |
| 325 | 85 | 15 |
| 326 | 90 | 10 |
| 327 | 95 | 5 |

EXAMPLES 328–346

Dye A is the dye of Example 3.

Dye B has the structure:

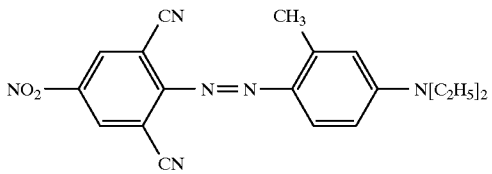

| Example | % A | % B |
|---------|-----|-----|
| 328 | 5 | 95 |
| 329 | 10 | 90 |
| 330 | 15 | 85 |
| 331 | 20 | 80 |
| 332 | 25 | 75 |
| 333 | 30 | 70 |
| 334 | 35 | 65 |
| 335 | 40 | 60 |
| 336 | 45 | 55 |
| 337 | 50 | 50 |
| 338 | 55 | 45 |
| 339 | 60 | 40 |
| 340 | 65 | 35 |
| 341 | 70 | 30 |
| 342 | 75 | 25 |
| 343 | 80 | 20 |
| 344 | 85 | 15 |
| 345 | 90 | 10 |
| 346 | 95 | 5 |

EXAMPLES 347–365

Dye A is the dye of Example 3.

Dye B has the structure:

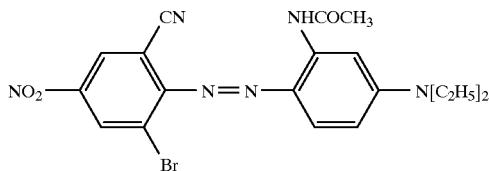

| Example | % A | % B |
|---------|-----|-----|
| 347 | 5 | 95 |
| 348 | 10 | 90 |
| 349 | 15 | 85 |
| 350 | 20 | 80 |
| 351 | 25 | 75 |
| 352 | 30 | 70 |
| 353 | 35 | 65 |
| 354 | 40 | 60 |
| 355 | 45 | 55 |
| 356 | 50 | 50 |
| 357 | 55 | 45 |
| 358 | 60 | 40 |
| 359 | 65 | 35 |
| 360 | 70 | 30 |
| 361 | 75 | 25 |
| 362 | 80 | 20 |
| 363 | 85 | 15 |
| 364 | 90 | 10 |
| 365 | 95 | 5 |

I claim:

1. An azothiophene of Formula (1):

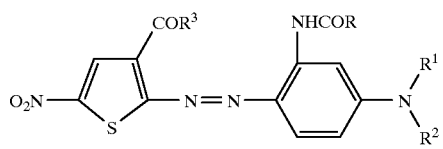

Formula (1)

in which

R, $R^1$, $R^2$ and $R^3$ each independently is alkyl or alkenyl.

2. An azothiophene according to claim 1 in which each of R, $R^1$, $R^2$ and $R^3$ is $C_{1-4}$-alkyl.

3. An azothiophene according to claim 2 in which $R^1$ and $R^2$ are both ethyl and R and $R^3$ are both methyl.

4. A dye mixture comprising an azothiophene according to claim 1 and an azothiophene of Formula (4):

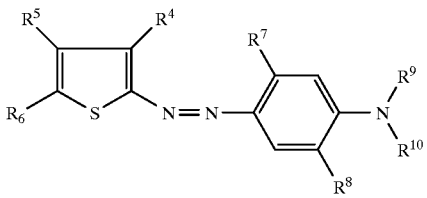

Formula (4)

in which $R^4$ is —CN, —Cl, —Br, —$NO_2$, $C_{1-4}$-alkylcarbonyl, phenylcarbonyl, $C_{1-4}$-alkylsulphonyl, —$COC_{1-4}$-alkyl, —$CONH_2$, —$CONH(C_{1-4}$-alkyl) or —$CON(C_{1-4}$-alkyl$)_2$;

$R^5$ is —H, $C_{1-4}$-alkyl, phenyl or —$COC_{1-4}$-alkyl;

$R^6$ is —H, $C_{1-4}$-alkyl, phenyl, $NO_2$, —CN, —Cl, —Br, —$COC_{1-4}$-alkyl, —$CONH_2$, —$CONH(C_{1-4}$-alkyl) or —$CON(C_{1-4}$-alkyl$)_2$;

$R^7$ is —H, $C_{1-4}$-alkyl, $C_{1-4}$-alkoxy, —Cl, —Br, —$NHCOC_{1-4}$-alkyl or —$NHSO_2C_{1-4}$-alkyl;

$R^8$ is —H, $C_{1-4}$-alkyl or $C_{1-4}$-alkoxy; and $R^9$ and $R^{10}$ each independently is —H, $C_{1-4}$-alkyl, $C_{2-4}$-alkenyl or $C_{1-4}$-alkyl substituted by —OH, $C_{1-4}$-alkoxy, —CN, phenyl, $C_{1-4}$-alkylCO—, $C_{1-4}$-alkoxyCO—, $HOC_{1-4}$-alkoxy, $C_{1-4}$-alkoxy-$C_{1-4}$-alkoxy, $C_{1-4}$-alkoxy-$C_{1-4}$-alkoxyCO—, —Cl or $C_{1-4}$-alkoxyCOO—.

5. A mixture according to claim 4 wherein the dye of Formula (4) has a structure in which $R^4$ is —$NO_2$, $R^5$ is —H, $R^6$ is —$NO_2$, $R^7$ is —$CH_3$, —$C_2H_5$, —$NHCOCH_3$, —$NHCOC_2H_5$, —$NHCOC_3H_7$ or —$NHCOCH(CH_3)_3$, $R^8$ is —H or —$OCH_3$ and $R^9$ and $R^{10}$ are both —$C_2H_5$.

6. A dye mixture comprising an azothiophene according to claim 1 and an azo compound of Formula (5):

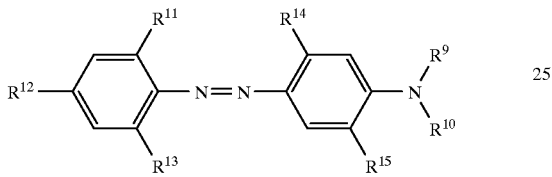

Formula (5)

in which $R^{11}$, $R^{12}$ and $R^{13}$ each independently is —CN, —$NO_2$, —Cl or —Br;

$R^{14}$ is —H, $C_{1-4}$-alkyl, —Cl, —Br, —$NHCOC_{1-4}$-alkyl or —$NHSO_2C_{1-4}$-alkyl;

$R^{15}$ is —H, $C_{1-4}$-alkyl or $C_{1-4}$-alkoxy; and $R^9$ and $R^{10}$ each independently is —H, $C_{1-4}$-alkyl, $C_{2-4}$-alkenyl or $C_{1-4}$-alkyl substituted by —OH, $C_{1-4}$-alkoxy, —CN, phenyl, $C_{1-4}$-alkylCO—, $C_{1-4}$-alkoxyCO—, $HOC_{1-4}$-alkoxy, $C_{1-4}$-alkoxy-$C_{1-4}$-alkoxy, $C_{1-4}$-alkoxy-$C_{1-4}$-alkoxyCO—, —Cl or $C_{1-4}$-alkoxyCOO.

7. A mixture according to claim 6 wherein the dye of Formula (5) has one of the following structures:

(a) wherein $R^{11}$ and $R^{13}$ are —CN, $R^{12}$ is —$NO_2$, $R^{14}$ is —$CH_3$, $R^{15}$ is —H and $R^9$ and $R^{10}$ are both —$C_2H_5$, (b) wherein $R^{11}$ is —CN, $R^{12}$ is —$NO_2$, $R^{13}$ is —Br, $R^{14}$ is —$NHCOCH_3$, $R^{15}$ is —H and $R^9$ and $R^{10}$ are both —$C_2H_5$.

(c) wherein $R^{11}$ is —CN, $R^{12}$ is —$NO_2$, $R^{13}$ is —Br, $R^{14}$ is —$NHCOC_2H_5$, $R^{15}$ is —H and $R^9$ and $R^{10}$ are both —$C_2H_5$.

(d) wherein $R^{11}$ and $R^{13}$ are —CN, $R^{12}$ is —$NO_2$, $R^{14}$ is —$NHCOCH_3$, $R^{15}$ is —H and $R^9$ and $R^{10}$ are both —$C_2H_5$.

(e) wherein $R^{11}$ and $R^{12}$ are $NO_2$, $R^{13}$ is —CN, $R^{14}$ is —$NHCOCH_3$, $R^{15}$ is —H and $R^9$ and $R^{10}$ are both —$C_2H_5$.

(f) wherein $R^{11}$ and $R^{12}$ are —$NO_2$, $R^{13}$ is —Br, $R^{14}$ is —$NHCOCH_3$, $R^{15}$ is —$OCH_3$ and $R^9$ and $R^{10}$ are both —$C_2H_5$.

8. A dye mixture comprising an azothiophene according to claim 1 and a disperse dye having one of the following structures:

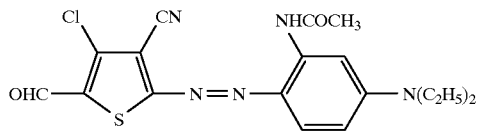

Formula (7)

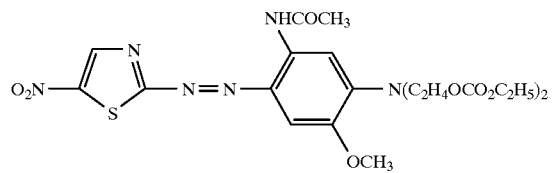

Formula (9)

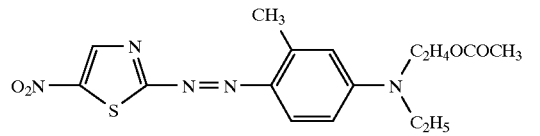

Formula (10)

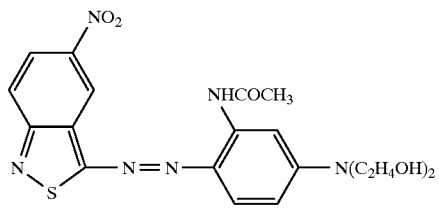

Formula (11)

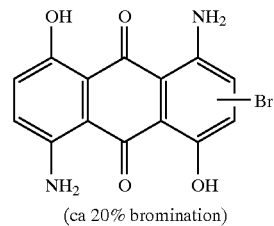

Formula (12)

(ca 20% bromination)

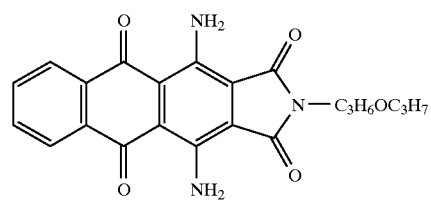

Formula (13)

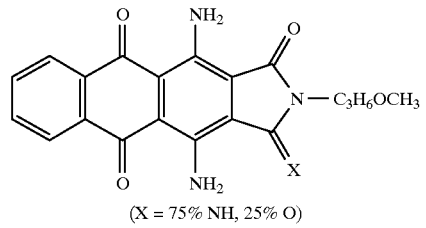

Formula (14)

(X = 75% NH, 25% O)

-continued

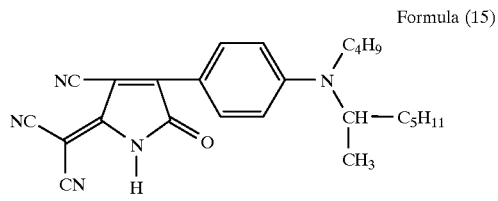

Formula (15)

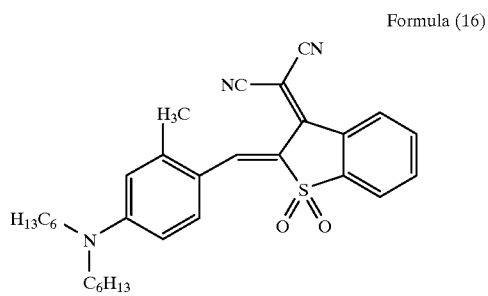

Formula (16)

-continued

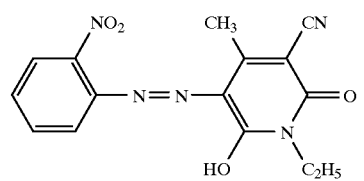

Formula (17)

and

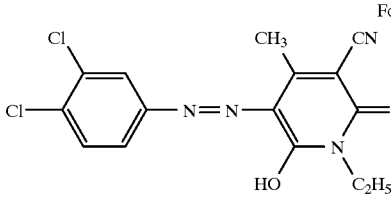

Formula (18)

9. A composition comprising a dispersion of an azothiophene according to claim 1 in an aqueous medium.

10. A process for colouring a synthetic textile material or fibre blend thereof which comprises applying thereto an azothiophene according to claim 1.

11. A process for colouring a synthetic textile material or fibre blend thereof which comprises applying thereto a dye mixture according to claim 4.

* * * * *

UNITED STATES PATENT AND TRADEMARK OFFICE
CERTIFICATE OF CORRECTION

PATENT NO. : 6,022,957

DATED : February 8, 2000

INVENTOR(S): Alan T. LEAVER

It is certified that an error appears in the above-identified patent and that said Letters Patent is hereby corrected as shown below:

On the title page, item [86], the PCT information is erroneously listed. It should be:

--[86] PCT No.: PCT/GB96/01533

§ 371 Date: April 17, 1998

§ 102(e) Date: April 17, 1998--

Signed and Sealed this

Sixth Day of March, 2001

*Attest:*

NICHOLAS P. GODICI

*Attesting Officer*   Acting Director of the United States Patent and Trademark Office